Patented Jan. 27, 1925.

1,524,233

UNITED STATES PATENT OFFICE.

JOHN J. BERRIGAN, OF CHICAGO, ILLINOIS.

FERTILIZER AND STOCK FOOD.

No Drawing.    Application filed June 28, 1922. Serial No. 571,558.

*To all whom it may concern:*

Be it known that I, JOHN J. BERRIGAN, a citizen of the United States, and a resident of the city of Chicago, county of Cook, State of Illinois, have invented certain new and useful Improvements in Fertilizers and Stock Foods, of which the following is a specification.

My invention relates to improvements in fertilizers and stock foods and methods of making the same, and has for its object the provision of an efficient and economically produced composition of matter especially adapted for use as a fertilizer or stock food and an improved method of producing the same from waste matter.

Other objects will appear hereinafter.

The invention consists of the fertilizer and stock foods and the methods of producing the same hereinafter described and claimed.

The preferred method of procedure in carrying on my process is to first produce a cooking bath by subjecting ordinary scrap iron to the action of fermenting blood. In most, of not all, meat packing and preparing establishments the blood from the slaughtered animals is recovered and cooked for a short time to coagulate the same, the coagulated blood being removed and utilized for fertilizer or other purposes. The liquor resulting from this treatment is known as "blood-water" and is usually discharged into the sewer as waste matter. Instead of discharging this water into the sewer, I run the same into a large tank containing a considerable quantity of scrap iron and then induce fermentation. The water is usually sterile, due to the cooking, and in order to start fermentation I add a small quantity of fresh and uncooked blood and the liquor thus produced will automatically ferment at ordinary temperatures in a short time; or, if desired, the first fermenting may be induced by adding yeast or other suitable fermenting including substance.

The action of the fermenting blood on the scrap iron is to dissolve the same forming a dark or black colored liquor. The action which probably takes place in this fermenting tank is that the iron combines with carbonic acid resulting from the fermentation and forms carbonate of iron. The carbonate of iron combines with ammonia present and forms iron hydrate. This iron hydrate combines with sulphur present in the organic matter present and forms black ferrous sulphide.

The liquor thus prepared and provided is then drawn off to be used as a bath for cooking other waste matter. As the cooked liquor is withdrawn, fresh "blood-water" is supplied and fresh scrap iron as the supply becomes exhausted due to the dissolution thereof. Thus a constant supply of the cooking liquor is maintained in said tank from ordinary waste products of a meat packing establishment.

Other waste matter, such as pecks, paunch manure, manure and other waste products from the digestive tracts of animals, hair, and the general garbage of a packing plant are collected in a closed tank or vessel and there cooked for a time, preferably from 4 to 6 hours, the use of a closed tank preventing the escape of ammonia. During this cooking the waste material should be kept covered with the cooking liquor. After such cooking, the material is allowed to stand and cool. During this time the solids of the mixture settle to the bottom. Thereafter the liquid portion is drawn off in any suitable way, as, for example, by any of the usual decanting methods. The liquid thus drawn off is wasted to the sewer and the solids are retained and subjected to further treatment.

At this stage the solids form a mass resembling wet sawdust or wet short straw, of a brownish color, which, if then dried, is very light in weight, and although valuable as a fertilizer, on account of its relatively important nitrogen content, has the disadvantage of bulkiness and is light enough in weight to be easily blown away and scattered.

To obviate these objections and add to the nitrogen content of the same, I subject the wet solids recovered from this cooking operation to a further treatment, which not only increases the density of the product but also adds to its nitrogen content.

In most, if not all, packing establishments, the waste accumulating on the floors, benches, etc., is gathered and cooked so as to separate the solid materials, which have a commercial value as fertilizers. The liquor drawn off from this mixture is known as "stick-water." This stick-water has but little value in that condition, although it contains a small percentage of available ammonia or nitrogen.

Usually the stick-water is evaporated to a thick, syrupy consistency and then is known as "stick." While in this form it has a considerable ammonia content, it is difficult to handle as a fertilizer, and therefore is generally mixed with a suitable absorbent and thus disposed of as an inferior fertilizer.

Instead of so disposing of the "stick", I add the same to the solid matter from the cooking operation above outlined and thus materially improve the same. To this end the solids from the cooking operation are preferably first pressed to reduce the water content and then thoroughly mixed with the "stick", using a sufficient proportion of said pressed solids to insure an absorption of the "stick", so that upon running the material through a dryer, the product obtained will be sufficiently hard so as to be capable of being ground into a powder and is then ready for use.

The final product or composition of matter thus produced will be found to constitute a highly desirable fertilizer. It is a dry powdery material having a distinct odor and contains a high percentage of available ammonia or nitrogen for fertilizing purposes. Tests have shown that such fertilizer contains over 10% of available ammonia on a 10% dry basis. The composition of matter thus produced is also well adapted to use as a stock food readily eaten by stock, and may be even more valuable for this purpose than as a fertilizer.

While I have set forth in detail the preferred form of the product and method of producing the same, these are capable of variation and modification without departing from the spirit of invention. I, therefore, do not wish to be limited to the precise details set forth, but I desire to avail myself of such variations and modifications as come within the scope of the appended claims.

Having described my invention, what I claim as new and desire to secure by Letters Patent is:

1. The method of making a compound of the class described which comprises subjecting organic matter to the action of ferrous sulphide, substantially as described.

2. The method of making a compound of the class described which comprises cooking organic matter with ferrous sulphide, substantially as described.

3. The method of making a compound of the class described which consists in cooking vegetable matter with ferrous sulphide and mixing the same with stick, substantially as described.

4. The method of making a compound of the class described which consists in subjecting organic matter to the action of fermenting blood constituents, substantially as described.

5. The method of making a compound of the class described, which comprises subjecting iron to the action of fermenting liquor derived from blood, and then treating animal organic matter with the resulting product, substantially as described.

6. The method of making a compound of the class described which comprises subjecting iron to the action of fermenting blood constituents; and then treating organic matter with the resulting product, substantially as described.

7. The method of making a compound of the class described which comprises subjecting iron to the action of fermenting blood constituents; then treating organic matter with the resulting product; and then mixing the resulting product with stick, substantially as described.

8. The method of making a compound of the class described which comprises subjecting iron to the action of fermenting blood constituents, then treating matter from the digestive tracts of animals with the resulting product; and then mixing the resulting product with stick, substantially as described.

9. The method of making a compound of the class described which comprises subjecting iron to the action of fermenting blood constituents; then cooking refuse from packing plants with the resulting product; then separating the solid matter from the liquid; then mixing stick with said solid matter; and then drying and grinding said mixture, substantially as described.

10. A compound of the class described comprising organic matter treated with ferrous sulphide, substantially as described.

11. A compound of the class described comprising organic matter treated with the product resulting from the subjection of iron to the action of fermenting liquor, substantially as described.

12. A compound of the class described comprising organic matter treated with the product resulting from the subjection of iron to the action of fermenting blood constituents, substantially as described.

13. A compound of the class described comprising organic matter cooked with the product resulting from the subjection of iron to the action of fermenting blood constituents, substantially as described.

14. A compound of the class described comprising organic matter cooked with the product resulting from the subjection of iron to the action of fermenting blood constituents, and mixed with stick, substantially as described.

In testimony whereof I have signed my name to this specification in the presence of two subscribing witnesses.

JOHN J. BERRIGAN.

Witnesses:
CLARENCE E. THREEDY,
JOSHUA R. H. POTTS.